United States Patent Office 2,738,280
Patented Mar. 13, 1956

2,738,280
METHOD OF INHIBITING THE BROWNING OF PLANT TISSUE

Rachel U. Makower and Sigmund Schwimmer, Berkeley, Calif., assignors to the United States of America as represented by the Secretary of Agriculture No Drawing. Application June 23, 1954,
Serial No. 438,887

2 Claims. (Cl. 99—154)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the preservation of raw edible plant materials and is particularly concerned with the treatment of raw fruits and vegetables so as to maintain the natural color of these products.

It is well known that when various fruits and vegetables such as apples, peaches, potatoes, etc. are subjected to disorganization of their natural structure as by peeling, cutting, comminuting, pulping, freezing, etc. the produce develops dark and unnatural colors. This discoloration is attributed to various chemical changes catalyzed by the enzymes naturally present in the plant material and is commonly referred to as enzymatic browning. In any preservation process whether it involves dehydration, freezing, cold storage, canning, or any combination of these, one must provide some means for controlling enzymatic browning if an acceptable product is to be produced.

In general according to the present invention raw edible plant material which is normally subject to enzymatic browning is treated with adenosine triphosphate which compound inhibits the browning of the fruits and vegetables. The basis of the activity of this compound in this regard has not been ascertained as yet but regardless of any theoretical factors it has been determined that adenosine triphosphate when applied to fruits and vegetables will inhibit browning.

The specific method of treatment which is preferred in any particular case will depend on the physical state of the produce and the manner in which it is to be preserved. There follows herewith several illustrative examples of how this invention is applied to preserving different types of produce by various methods.

Example I

Potatoes are peeled, washed, then dipped in an aqueous solution containing adenosine triphosphate in a concentration of about 0.06% to about 6%. The potatoes are removed from the bath, drained, and packaged in wax-paper cartons and kept in a refrigerator at about 32–50° F. These pre-peeled potatoes will maintain their natural color for a week or more, depending on the concentration of adenosine triphosphate in the dipping solution.

If desired the peeled potatoes may be subjected to slicing prior to the adenosine triphosphate dip, so they will be instantly available for making French-fried potatoes. The adenosine triphosphate solution may be applied to the potatoes or slices thereof by spraying instead of dipping.

Example II

Apples are peeled, cored, sliced, then dipped in a solution of adenosine triphosphate (about 0.06 to 6%). The slices are removed from the bath, drained, packaged in cartons, frozen, and maintained in frozen storage. On thawing of the frozen apples it will be noted that the slices have essentially a natural color whereas without the adenosine triphosphate dip they would be brown.

This type of treatment is also applicable to many other types of produce such as peaches, pears, apricots, peas, beans, potatoes, cauliflower, and so forth. Where the produce is to be preserved in comminuted or liquefied forms as a sauce, puree, pulp, nectar, juice, concentrated juice, etc. the adenosine triphosphate may be simply incorporated in the product prior to packaging and freezing or preferably the adenosine triphosphate is applied to the produce by spraying or dipping prior to comminuting to prevent darkening during this step of the procedure.

Example III

Fresh apricots are washed thoroughly, dipped in a solution of adenosine triphosphate then mashed. The mashed product is screened to remove pits, skins, etc. The screened puree is then admixed with enough adenosine triphosphate to establish a concentration of about 0.06% to about 6% of this compound in the puree. Sugar may also be added to sweeten the product if desired. The puree is then packaged and frozen.

Example IV

Peaches are washed, peeled, and halved. The peach halves are then immersed in an aqueous 0.06 to 6% solution of adenosine triphosphate. The halves are left in the solution until they are ready for canning whereby during this period browning of the fruit is prevented. In canning the products they are removed from the bath, drained, placed in cans with syrup, the cans sealed and heat processed in the usual manner to ensure sterility.

The above procedure may be applied to other forms of produce to protect the color thereof in the interim between the time when the produce is peeled, sliced, comminuted, etc. and the time when the product is canned and the enzymes thus inactivated.

It is sometimes desirable to use an impregnation technique to cause the adenosine triphosphate to penetrate into the tissue of the plant material thus to protect inner parts of the tissue as well as the surface from enzymatic discoloration. Such impregnation can be readily accomplished by immersing the produce in a solution of adenosine triphosphate then subjecting the solution and produce to a vacuum to draw air or other gases out of the plant tissue to allow deep penetration of the solution. If desired, additional materials such as sugar, flavoring agents, etc. may be incorporated in the solution to enhance the flavor of the product. An especially desirable solution for impregnating apples, for example, is an aqueous solution containing about 40 to 60% sugar and a minor amount of adenosine triphosphate on the order of 0.06% to 6%. The adenosine triphosphate will prevent darkening of the apples and the sugar will decrease the amount of liquid which bleeds from the fruit when it is thawed after being preserved by freezing. Firming agents such as calcium chloride may also be added to the impregnating solution. The following example illustrates such a technique.

Example V

Apples are peeled, cored, trimmed, and sliced. The slices are placed in a jar and covered with an aqueous solution containing 60% sucrose, and about 3% adenosine triphosphate. A vacuum is then applied over the surface of the liquid and maintained until most of the air is exhausted from the apple tissue, i. e., until frothing and bubbling cease. The vacuum is then broken and after remaining in the syrup a few minutes, the slices are removed, drained, packaged and frozen. On thawing it will be observed that the slices have a natural color and will exude little, if any, liquid.

In the examples below the effectiveness of adenosine triphosphate in inhibiting browning is demonstrated by scientific measurements.

*Example VI*

Raw potatoes were macerated with water and the macerate was divided into several lots. To each lot was added a different proportion of adenosine triphosphate (as indicated below). To one lot, nothing was added thus to furnish a control. All the samples were stored for 23 hours at 1° C. After this period, the samples were subjected to measurement with a photometer to determine the optical density of each at 440 millimicrons. The optical density, measured in arbitrary units, is an index of the amount of browning which has taken place; the browner the solution, the higher is the optical density. The results obtained are tabulated below:

| Sample | Percent of adenosine triphosphate, based on weight of raw potato in macerate | Optical density | Percent inhibition of browning |
| --- | --- | --- | --- |
| 1 | none (control) | 33.5 | 0 |
| 2 | 1.5 | 30.0 | 4 |
| 3 | 3.0 | 22.5 | 27 |
| 4 | 4.5 | 21.0 | 37 |
| 5 | 6.0 | 17.5 | 48 |

*Example VII*

Raw potatoes were macerated in water and the material was divided into two lots. To one lot was added adenosine triphosphate in a concentration of 0.6% based on the weight of raw potato in the macerate. Nothing was added to the other lot thus to furnish a control. The samples were allowed to stand at 1° C. and at intervals aliquots of the samples were subjected to optical measurements. This was done by centrifuging the macerate to separate the clear liquid and then determining the light transmittance of the liquid, this measurement being an index of the degree of browning, since the browner the sample the less light will be transmitted. The results obtained are set forth below:

| Time, min. | Potato macerate control Transmittance, percent | Potato macerate with added adenosine triphosphate Transmittance, percent |
| --- | --- | --- |
| 0 | 87 | 87 |
| 12 | 80 | 85 |
| 18 | 78 | 84 |
| 36 | 72 | 82.5 |
| 43 | 70 | 80.5 |
| 50 | 68.7 | 81 |

*Example VIII*

A batch of raw potato slices were divided into two batches. The slices of one bath were coated with a 6% solution of adenosine triphosphate using a few drops per slice. The slices in the second batch were not treated in any way thus to provide a control. The slices were held overnight in a refrigerator at 1° C. The slices were then examined and it was observed that the control slices were dark gray whereas the slices coated with adenosine triphosphate had a natural creamy color.

This invention may be applied to any type of edible plant material as for example, potatoes, sweet potatoes, carrots, peas, beans, cabbage, spinach, broccoli, avocadoes, mushrooms, cauliflower, squash, peaches, apples, pears, nectarines, apricots, figs, dates, etc. The proportion of adenosine triphosphate to be applied in any particular case will depend on the type of produce in question and the degree of stability desired. Obviously produce which exhibits very active browning tendencies, apples for example, will require more of the stabilizing agent than will a material of lesser browning tendencies such as string beans. Moreover if the end sought is merely a temporary stabilization such as during at most several hours between cutting and canning, less of the stabilizing agent will be needed than where the aim is to stabilize a fresh frozen product for long periods. In any case the optimum amount of adenosine triphosphate can easily be determined by conducting pilot experiments on small lots of the fruit or vegetable in question. In many cases a concentration on the order of about 0.06% to about 6% of adenosine triphosphate will give good results. It is evident that no harm will be done if more of this agent is added to the food product. It may be of interest to note that adenosine triphosphate is a normal constituent of most living tissue and will not detract from the nutritive value of the food treated with it nor will it affect the natural flavor or color of the food.

The compound adenosine triphosphate has acidic properties and will form salts with bases. The compound may be employed in its usual acidic form or in the form of salts with alkali metals or ammonium. It is understood that the expression adenosine triphosphate as used herein is inclusive of the acid form of this compound and also its salts with alkali metals or ammonium.

Having thus described our invention, we claim:

1. A method comprising treating a raw edible plant material normally subject to enzymatic browning with adenosine triphosphate to inhibit the browning.

2. The method of claim 1 wherein the plant material is potato.

References Cited in the file of this patent

UNITED STATES PATENTS

| | | |
| --- | --- | --- |
| 2,506,793 | Kalmar et al. | May 9, 1950 |
| 2,592,563 | Hall et al. | Apr. 15, 1952 |
| 2,620,277 | Scalera | Dec. 2, 1952 |
| 2,678,277 | Glabe | May 11, 1954 |